United States Patent [19]
Eubank et al.

[11] 3,997,740
[45] Dec. 14, 1976

[54] PULSE TRAIN ANALYZER

[75] Inventors: Carol Hewitt Eubank, Greenwood; Charles Ronald Mimna, Acton, both of Ind.

[73] Assignee: Bell Telephone Laboratories, Incorporated, Murray Hill, N.J.

[22] Filed: May 30, 1975

[21] Appl. No.: 582,372

[52] U.S. Cl. .................. 179/175.2 A; 324/79 D; 324/186
[51] Int. Cl.² .......................................... H04M 3/08
[58] Field of Search .......... 179/175.2 A; 178/69 A; 324/79 D, 186

[56] References Cited
UNITED STATES PATENTS

| | | | |
|---|---|---|---|
| 2,684,409 | 7/1954 | Kessler | 179/175.2 A |
| 2,857,484 | 10/1958 | Culbertson | 179/175.2 A |
| 3,537,003 | 10/1970 | Planta et al. | 324/79 |
| 3,603,745 | 9/1971 | Mann | 179/175.2 A |
| 3,603,746 | 9/1971 | Heick et al. | 179/175.2 A |
| 3,735,263 | 5/1973 | Boatwright | 324/186 |
| 3,766,323 | 10/1973 | Wittman | 179/16 E |

*Primary Examiner*—Douglas W. Olms
*Attorney, Agent, or Firm*—Harry L. Newman

[57] ABSTRACT

A pulse train analyzer utilizing digital clock frequencies corresponding to the minima and maxima of the acceptable performance ranges provides a pass-fail visual indication depending upon whether the pulses are uniform, and the speed and percent break figures are within the specified ranges.

10 Claims, 6 Drawing Figures

DIGITAL FILTER 10

COMMAND GENERATOR 20

PULSE TRAIN ANALYZER

BACKGROUND OF THE INVENTION

1. Field of the Invention

The rotary dial pulse train analyzer described in the subject disclosure relates to telephone dial testing equipment generally, and more specifically, to the type of test equipment designed to test the operation of dials on a pass-fail basis. This test equipment can be used by the telephone operating companies in the testing of telephone sets to determine which sets may be returned to service without repair, or in testing telephone dials during the manufacturing process.

2. Description of the Prior Art

The prior art includes analog-type dial pulse testers such as the Boring U.S. Pat. No. 3,410,967, the La Barge et al. U.S. Pat. No. 3,243,526, and the Danville et al. U.S. Pat. No. 3,123,679 which measure the "percent break" ratio of a dial pulse train by the use of either relay counting circuits or RC timing circuits. These prior art pulse testing circuits require calibration or some other form of adjustment to provide and maintain accurate performance.

Other prior art patents, such as the Boatwright U.S. Pat. No. 3,735,263, and the Mann U.S. Pat. No. 3,603,745, show dial pulse testers which use various digital techniques to measure the percent break ratio of a dial pulse train. The percent break ratio of a dial pulse train is defined in the art as the ratio of the time during which the dial contacts are opened (i.e., "break") to the total duration of the dial pulse which is the sum of the interval that the dial contacts are closed (i.e., "make") and the interval that the dial contacts are open (i.e., break) i.e., total time = (make + break). The percent break ratio is used to describe the relative dimensions of a dial pulse; moreover, if it falls outside of a given nominal range, it may indicate a defective dial. The above prior art testers either measure the percent break ratio on an average basis, or use some form of dividing circuitry to obtain the result as a percentage figure.

SUMMARY OF THE INVENTION

In a rotary dial pulse analyzer described herein, all pulses in the dial pulse train exceeding one millisecond are tested to insure a pulse speed between 9 and 11 pulses per second, uniformity between successive pulses, and a break period between 58 percent and 64 percent of the total pulse period. The pulse analyzer provides a pass-fail indication to the operator upon the successful completion or failure of the dialing test. Calibration is not required because the analyzer takes advantage of digital circuitry to examine the dial pulse train.

A pulse analyzer in accordance with the present invention comprises a crystal-controlled clock circuit and frequency related divide-by circuits which generate a plurality of clock timing frequencies. These clock frequencies are exposed to a dial pulse train on a pulse-by-pulse basis to check the pulse speed, the percent break ratio and the pulse uniformity. In checking the percent break ratio limits, a reference frequency is generated. A fraction of the reference frequency corresponding to the minimum of the range (i.e., 58 percent) and a fraction of the reference frequency corresponding to the maximum of the range (i.e, 64 percent) is generated from the reference frequency by the divide-by circuitry. Each of these fractional frequencies is counted during the break portion of each dial pulse. The reference frequency is counted during the total pulse period of each dial pulse. As a check on pulse uniformity, the reference frequency is counted during the total pulse period comprising the make portion preceding the break portion (i.e., "make-break") and also during the period comprising the make portion following the break portion (i.e., "break-make"). The contents of the counters can then be examined directly by a digital comparator to see if the percent break ratio is within the range.

Digital technique is also used to test dial pulse speed. The digital filter provided therein serves to digitize the dial pulse train and reconstruct the dial pulses from the digital pulses. If a spurious pulse signal of less than one millisecond is present in the pulse train it will be ignored and not reconstructed by the digital filter. Since it ignores the spurious spikes, the digital filter prevents the pulse analyzer from rejecting dials because of insignificant noise.

Since the dial pulse train is tested on a digital basis and gives a pass-fail visual indication, the dial pulse analyzer does not need calibration and may be used by personnel inexperienced with the details of its operation.

DETAILED DESCRIPTION

Figure 1:
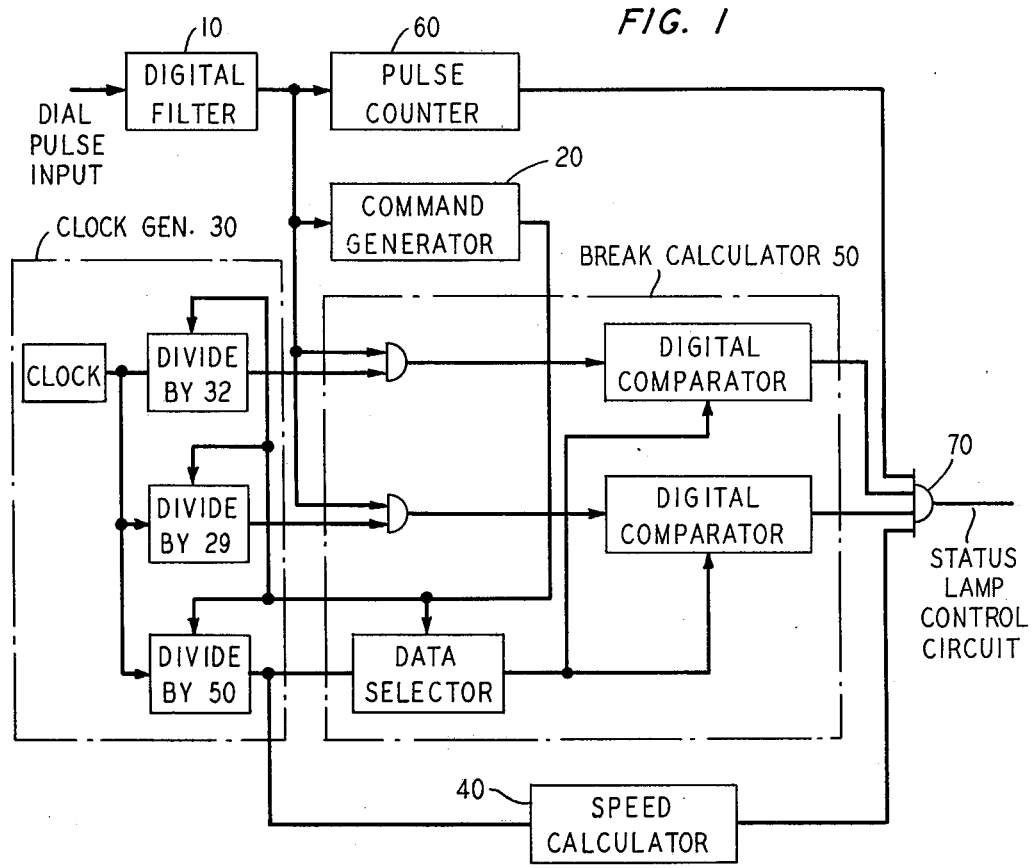
FIG. 1 shows a block diagram of a pulse analyzer in accordance with the present invention.

FIG. 1 shows a block diagram of the pulse analyzer in accordance with the present invention which comprises a digital filter 10 which digitizes the dial pulse train input and filters out all pulses less than one millisecond in duration. A command generator 20 receives the processed pulse from the output of the digital filter 10 and produces command control pulses of the proper width to the other parts of the circuit at the correct times. In addition, a clock generator 30 and its associated divide-by circuitry provide the appropriate clock frequencies. A speed calculator 40 insures that the dial pulse speed is within the appropriate limits, while a percent break calculator 50 insures that the break limits of the dial pulse are within their appropriate limits. Finally, a pulse counter circuit 60 detects a total of ten rotary dial pulses to insure full travel of the rotary dial, and a status lamp control circuit 70 illuminates either the pass lamp or the fail lamp. The respective analyzer sections are more thoroughly understood by reference to FIGS. 2 through 9.

Digital Filter

Figure 2:
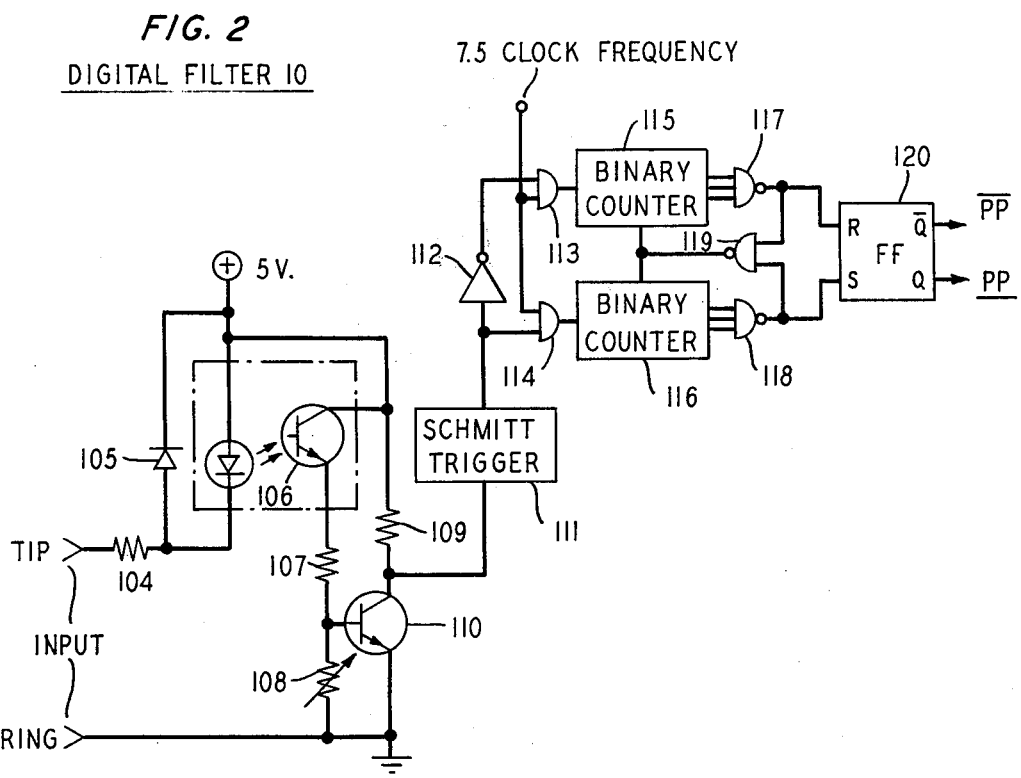
FIG. 2 is a circuit schematic of the digital filter portion of the diagram shown in FIG. 1.

Assuming that a dial on a telephone set is to be tested the tip and ring leads of the set are connected to the input of the digital filter as shown in FIG. 2. A conventional optical isolator 106 couples the unprocessed dialing pulses generated by the dial of the telephone set dialing circuit (tip and ring) to a transistor 110. Protection for the optical isolator 106 is provided by a voltage limiting diode 105 and a current limiting resistor 104. Resistors 107 and 108 function as a voltage divider to set the current threshold point for transistor 110. The output of transistor 110 developed across resistor 109 is directly coupled to a Schmitt trigger 111 which squares off any ramp edges in the dial pulse train. This is done because some integrated circuits do not reliably respond to ramp edges.

The output of the Schmitt trigger 111 is coupled directly to AND gate 114 and to AND gate 113 through inverter 112. The clock timing frequency (7.5 kHz) is coupled to the other input of AND gate 113 to digitize the make periods of the dial pulse train and to the other input of AND gate 114 to digitize the break periods. The output of AND gate 113 is coupled to binary counter 115 and the output of AND gate 114 is coupled to binary counter 116. These binary counters 115, 116 are used in conjunction with NAND gate 117 and NAND gate 118 respectively to detect every 8 pulses from the digitizing clock frequency. The binary counters 115, 116 are reset by NAND gate 119 each time NAND gate 117 or NAND gate 118 detect a count of eight. The output of NAND gate 118 is coupled to the set input of flip-flop 120, while the output of NAND gate 117 is coupled to the reset input of flip-flop 120. The Q output of flip-flop 120 is used to reconstruct the dial pulses by producing a processed pulse train PP from the digitized dial pulses. The complementary wave train $\overline{PP}$ which is the inverted waveform of dial pulse train PP is generated at the $\overline{Q}$ output of flip-flop 120.

It should be noted that if a pulse spike of less than approximately one millisecond (8 ÷ 7.5 kHz ≅ 1 millisecond) is digitized, the binary counters 115, 116 do not load to the count of eight; therefore, no output will exist from NAND gates 117, 118 and the flip-flop 120 will not reconstruct that pulse. Accordingly, the Q output of the flip-flop 120 is a processed pulse train PP with individual pulses having a duration of at least one millisecond. The digital filter makes the pulse analyzer insensitive to noise spikes of less than one millisecond in duration. Since most telephone key equipment is not responsive to perturbations of less than one millisecond, this filtering action eliminates the unnecessary rejection of telephone dials.

Command Generator

Figure 3:
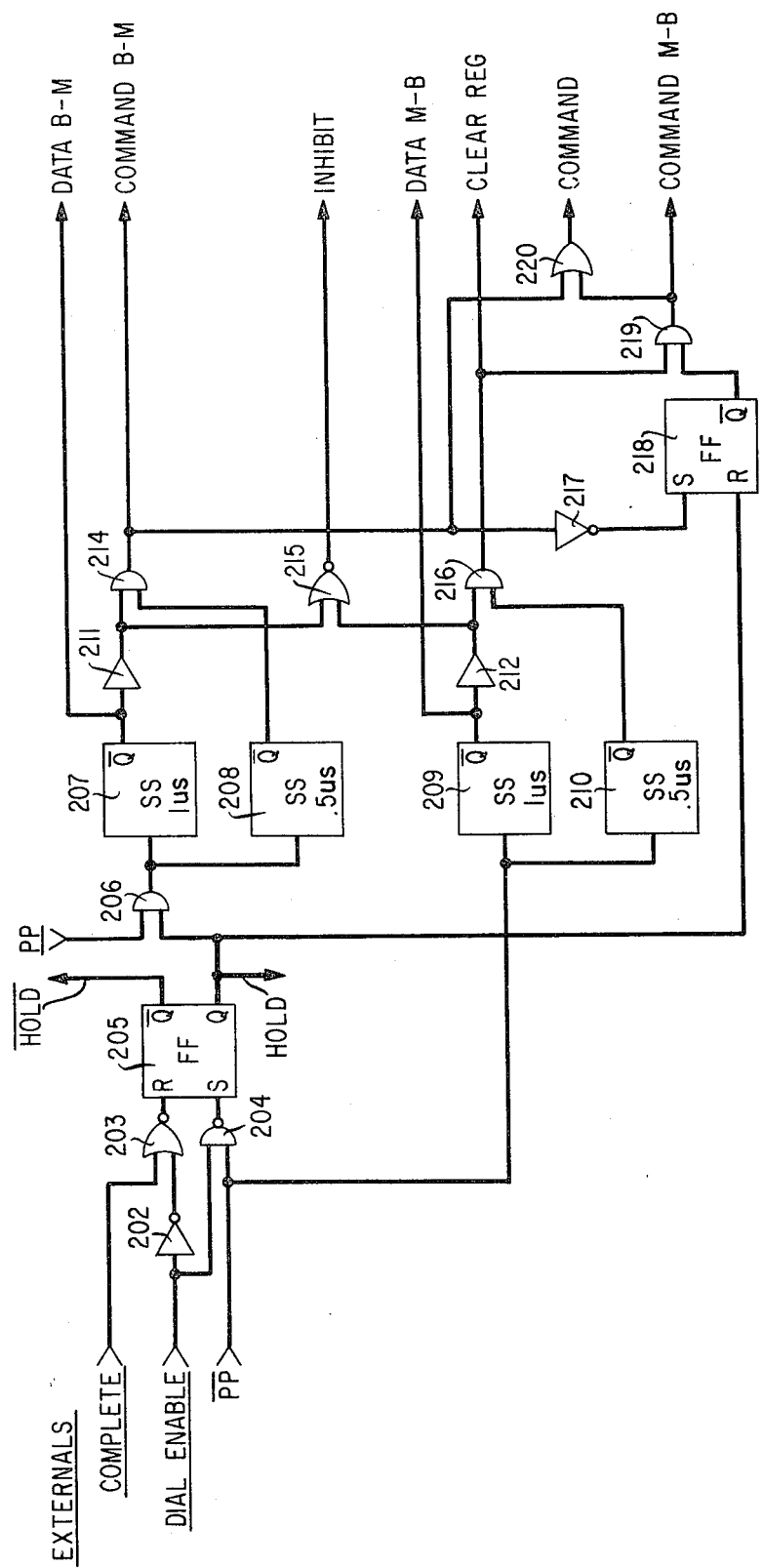
FIG. 3 is a circuit schematic of the command generator portion of the diagram shown in FIG. 1.
Figure 6:
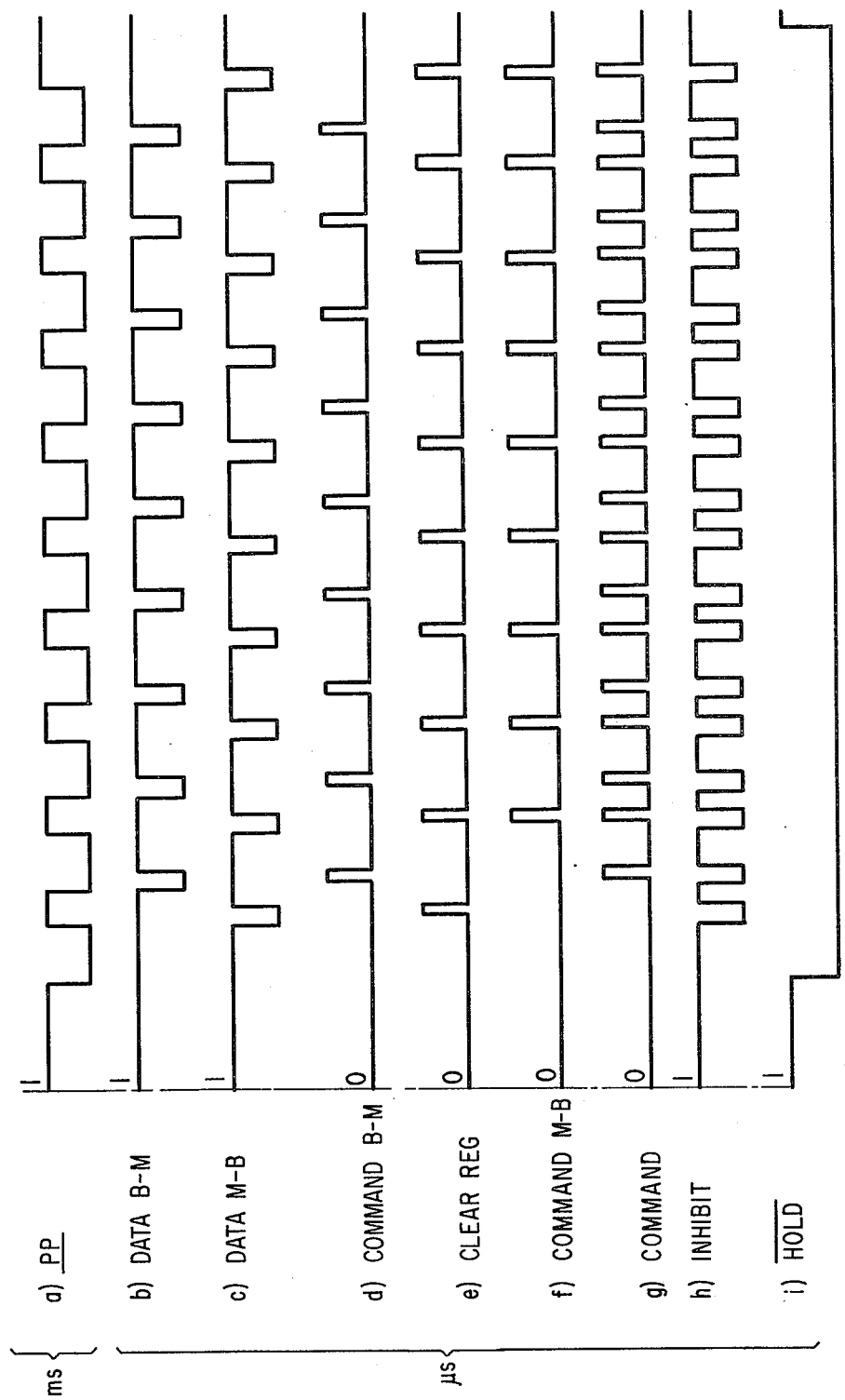
FIG. 6 is a timing diagram showing the relative relationship of the various command signals with respect to the dial pulse train PP.

The purpose of the command generator 20 as shown in FIG. 3 is to produce command pulses of the proper width at the correct time to the various parts of the circuit, as more fully explained by reference to the timing diagram of the command signals as shown in FIG. 6.

Two control signals, Complete and Dial Enable, are generated external to the pulse analyzer, and are applied to the command generator 20. The Complete control signal, which is normally a logical O and momentarily goes to a logical 1 600 milliseconds after the tenth dial pulse has entered the analyzer, is coupled to one input of a NOR gate 203. The Dial Enable control signal, which is a logical 1 pulse for the entire duration of the testing cycle, is coupled to the other input of the NOR gate 203 through inverter 202. The output of NOR gage 203 is coupled to the reset input of flip-flop 205. Either the 1 of the Complete control signal or the 0 of the Dial Enable control signal will prevent the dial pulse analyzer from making any calculations by putting flip-flop 205 in its reset condition.

The Dial Enable control signal is also coupled to one input of NAND gate 204. The complementary pulse train $\overline{PP}$ is coupled to the other input of NAND gate 204. The output of NAND gate 204 is coupled to the set input of flip-flop 205. This arrangement allows the analyzer to ignore the first leading edge of dial pulse train PP.

This is because the flip-flop 205 is not set until the first leading edge of the complementary pulse train $\overline{PP}$ is applied. The reason for disregarding the first edge of dial pulse train PP is that the first edge dosen't represent a complete pulse.

It should be recognized that the complementary pulse train $\overline{PP}$ is the inverted waveform equivalent of the dial pulse train PP. Reference to the complementary pulse train $\overline{PP}$ is made in the circuit instead of to the processed pulsed train PP whenever the nature of the logic device makes it more convenient to refer to positive logic instead of negative logic, and vice versa, e.g., a "high" is needed instead of a "low", a logical 1 instead of a logical 0, or a "leading edge" instead of a "trailing edge". It should be apparent that an inverter and the processed pulse train PP can form the full equivalent to the complementary pulse train $\overline{PP}$. The $\overline{Q}$ output of flip-flop 205 is a logical 0 if the flip-flop 205 has been set by the output of the NAND gate 204 and not reset by the output of NOR gate 203. This $\overline{Q}$ output of flip-flop 205 is the $\overline{Hold}$ command signal (shown in (i) of FIG. 6).

The Hold command signal, which is a 1 generated at the "Q" output of flip-flop 205, is coupled to one input of AND gate 206, and the dial pulse train PP is coupled to the other input of AND gage 206. Thus the output of AND gate 206 follows the dial pulse train PP and causes single-shot multivibrators 207, 208 to generate pulses one microsecond and 0.5 microsecond wide respectively for nine of the ten loading edges of the dial pulse train PP. The output of the single-shot multivibrator 207 is the Data B-M command signal (shown in (b) of FIG. 6) which is used as a reset signal in the break calculator section 50. These one microsecond pulses are inverted by inverter 211 and coupled to the input of AND gate 214 along with the 0.5 microsecond pulses from the output of the single-shot multivibrator 208. The output of AND gate 214 produces the Command B-M command signal (shown in (d) of FIG. 6) which is a series of 0.5 microsecond pulses offset 0.5 microsecond from the trailing edges of dial pulse train PP.

The complementary pulse train $\overline{PP}$ is coupled to single-shot multivibrator 209 whose Q output is the Data M-B command signal a series of one microsecond pulses (shown in (c) of FIG. 6). The Data M-B signal is a reset signal used in the percent break section 50. The complementary pulse $\overline{PP}$ is also coupled to single-shot multivibrator 210 which generates a series of 0.5 microsecond pulses which are coupled to AND gate 215. The one microsecond Data M-B pulses are also coupled through inverter 212 to the AND gate 216 to produce the command signal Clear-Reg (shown in (e)

of FIG. 6). This is a series of 0.5 microsecond pulses offset 0.5 microseconds from the leading edges of dial pulse train PP and provides a reset command for one of the binary counters in the break calculator section 50. Single-shot multivibrators 209 and 210 opearate similarly to single-shot multivibrators 207 and 208 described above except that they trigger in response to the trailing edges of dial pulse PP.

The Command B-M signal from the output of AND gate 214 is coupled through inverter 217 to the set input of flip-flop 218. The Hold command signal from the output of flip-flop 205 is coupled to the reset input of flip-flop 218. The Q output of flip-flop 218 is coupled to the AND gate 219 along with the Clear-Reg command signal to produce the Command M-B command signal (shown in (f) of FIG. 6) which is the series of 0.5 microsecond pulses offset 0.5 microsecond from the leading edges of dial pulse train PP.

The Data M-B and the Command M-B command signals are similar to the Data B-M and the Command B-M command signals, respectively, except that they are generated in response to the leading edges of dial pulse train PP. Again, the flip-flop 218 is used to ignore the first leading edge of dial pulse train PP since it doesn't represent a complete dial pulse period.

The inverted forms of Data M-B and Data B-M command signals are coupled through inverters 211, 212 to NOR gate 215 to produce Inhibit command signal (shown in (h) of FIG. 6) which is used in the break calculator section 50. The Inhibit command signal is a one microsecond pulse generated at beginning and end of each break period.

The Command B-M and Command M-B command signals are coupled to OR gate 220 to produce the Command command signal (shown in (g) of FIG. 6) which is used in the status lamp control circuit section 70. The Command B-M command signal is also used as a reset control signal in the speed calculator 40.

Clock Generator

Figure 4:
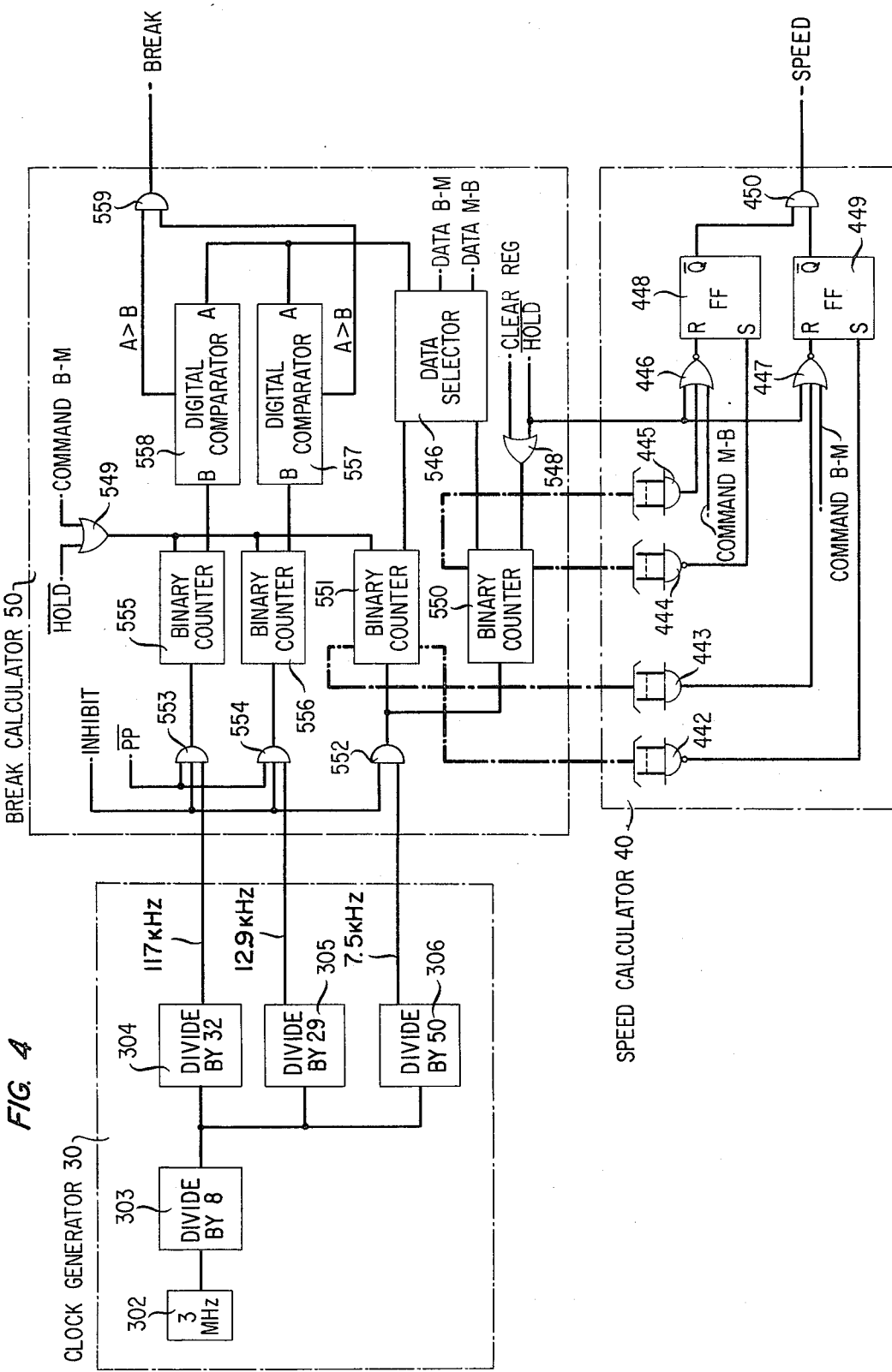
FIG. 4 is a circuit schematic of the clock generator and the percent break calculator, portions of the diagram shown in FIG. 1.

As shown in FIG. 4, the clock generator 30 comprises a 3 megahertz crystal-controlled clock oscillator 302 that in combination with a divide-by-eight circuit 303 produce a fundamental clock frequency of 375 kHz. The fundamental frequency is coupled to a divide-by-32 circuit 304, a divide-by-29 circuit 305, and a divide-by-50 circuit 306. The acceptable percent break range for a telephone dial pulse train is from 58 percent to 64 percent of the total pulse period. Accordingly, the relative ratios of the respective divide-by circuits (therefore the clock frequencies) are in the same relative proportion (58:64:100).

The divide-by-32 circuit 304 divides the fundamental frequency of 375 kHz by 32. The resulting clock frequencies at 11.7 kHz are used to digitize the break periods of the pulses. The divide-by-29 circuit 305 divides the fundamental frequency of 375 kHz by 29. The resulting clock frequencies are also used to digitize the break period, but at a rate of 12.9 kHz. The divide-by-50 circuit 306 divides the fundamental frequency of 375 kHz by 50. The resulting reference clock frequencies are used to digitize the total pulse period at a rate of 7.5 kHz.

Break Calculator

FIG. 4 also shows how the break calculator circuitry 50 checks the percent break ratio against the acceptable range limits.

The Hold command signal (shown in (i) of FIG. 6) is coupled to one input of OR gate 549 and the Command B-M command signal (shown in (d) of FIG. 6) is coupled to the other input. The output of OR gate 549 is coupled to the reset input of binary counters 551, 555, 556. The Hold command signal is also coupled to one input of OR gate 548. The Clear-Reg command signal (shown in (e) of FIG. 6) is coupled to the other input of OR gate 548. The output of OR gate 548 is coupled to the reset input of binary counter 550. The HOLD command signal resets the binary counters 550, 551, 555, 556—600 milliseconds after the tenth dial pulse has entered the analyzer. The Command B-M command signal resets the binary counters 551, 555, 556— five-tenths microseconds after the end of each break-make period. The Clear-Reg command signal resets the binary counter 550, five-tenths microseconds after the end of each make-break period. This 0.5 microsecond delay allows the counters 550, 551, 555, 556 to settle down before resetting.

The Inhibit command signal is coupled to AND gates 552, 553, 554. The complementary pulse train $\overline{PP}$ is coupled to AND gates 553, 554. The 7.5 kHz reference frequency is coupled to AND gate 552, and the two fractional clock frequencies 11.7 kHz and 12.9 kHz are coupled to AND gates 553, 554, respectively.

The output of AND gate 552 is coupled to binary counters 550, 551 and the outputs of AND gates 553, 554 are respectively coupled to binary counters 555, 556. The binary counter 555 counts the 11.7 kHz clock pulses generated during the break period of an individual dial pulse. Similarly, the binary counter 556 counts the 12.9 kHz clock pulses generated during the same break period. The outputs of binary counters 555, 556 are continuously applied to the B leads of digital comparators 558, 557, respectively. Binary counter 550 counts the 7.5 kHz clock pulses generated during the make-break period, while binary counter 551 counts the 7.5 kHz clock pulses generated during the break-make period. These binary numbers are applied to the data selector 546. The data selector 546 then inputs the break-make binary number and the make-break binary number into A leads of the comparators 558, 557 in response to the command pulses Data B-M and Data M-B. Command signals Data B-M and Data M-B strobe the information to the digital comparators 557, 558 at the proper times. Comparator 558 checks to see if the binary number at the B lead representing the 64 percent upper limit of a break period is less than the binary number at the A lead representing a total pulse period. When the Data selector 546 is strobed by the command signal Data B-M this total pulse period comprises the combination of the break period and the succeeding make period. When the data selector 546 is strobed by the command signal Data M-B, this total pulse period comprises the combination of the break period and the preceding make period. Comparator 557 checks to see if the binary number at the B lead representing the 58 percent lower limit of the break period is greater than the binary number at the A lead representing the same total pulse period applied to A lead of comparator 558.

If both conditions are met, the output of AND gate 559 goes to a logical 1, indicating that the percent break ratio is within the limits. Since the above comparison is made during both the break-make and make-break periods, a logical 1 also indicates that the dial pulses are uniform.

Speed Calculator

The speed calculator 40 is also shown in FIG. 4. The acceptable pulse speed limits are between 9 pulses per second and 11 pulses per second. Since we are also concerned with pulse uniformity, the test for pulse speed is performed on both the make-break counter 550 and the break-make counter 551.

The binary information from the break-make binary counter 551 is coupled to NAND gate 442 and to AND gate 443 while the binary information from the make-break binary counter 550 is coupled to NAND gate 444 and to AND gate 445. NAND gates 442, 444 have as many inputs as necessary to detect the binary pulse number which corresponds to the lower speed limit of the dial (i.e., 9 pulses per second) at the 7.5 kHz timing frequency. AND gates 443, 445 likewise have as many inputs as necessary to detect the binary pulse number which corresponds to the upper speed limit of the dial (i.e., 11 pulses per second) at the 7.5 kHz timing frequency.

The output of NAND gates 442, 444 is coupled to the set inputs of the respective flip-flops 449, 448. The output of AND gate 443 is coupled to one input of NOR gate 447. The output of AND gate 445 is coupled to NOR gate 446. The ouput of NOR gates 446, 447 is coupled to the reset input of flip-flops 448, 449, respectively.

If the NAND gates 442, 444 have detected the binary number which corresponds to the lower speed limit, the flip-flops 449, 448 are set, which makes the Q output a logical 1. If the upper speed limit has been exceeded, as determined by whether AND gates 443, 445, have detected the binary number corresponding to the upper speed limit, the flip-flops 449, 448 are reset, making the Q output a logical 0.

The $\overline{Q}$ outputs of the flip-flops 448, 449 are coupled to AND gate 450. If the outputs are both logical 1, the output of AND gate is a logical 1 indicating that the pulse speed is within its limits on both the break-make counter 551 and the make-break counter 550.

The Hold command signal is coupled to NOR gates 446, 447 and resets the flip-flops 448, 449 after the tenth pulse has entered the pulse analyzer. The Command M-B command signal is coupled to the NOR gate 446 and resets the flip-flop 448 at the end of each make-break period. The Command B-M command signal is coupled to the NOR gate 447 and resets the flip-flop 449 at the end of each break-make period.

Status Lamp Indicator Circuit

Figure 5:
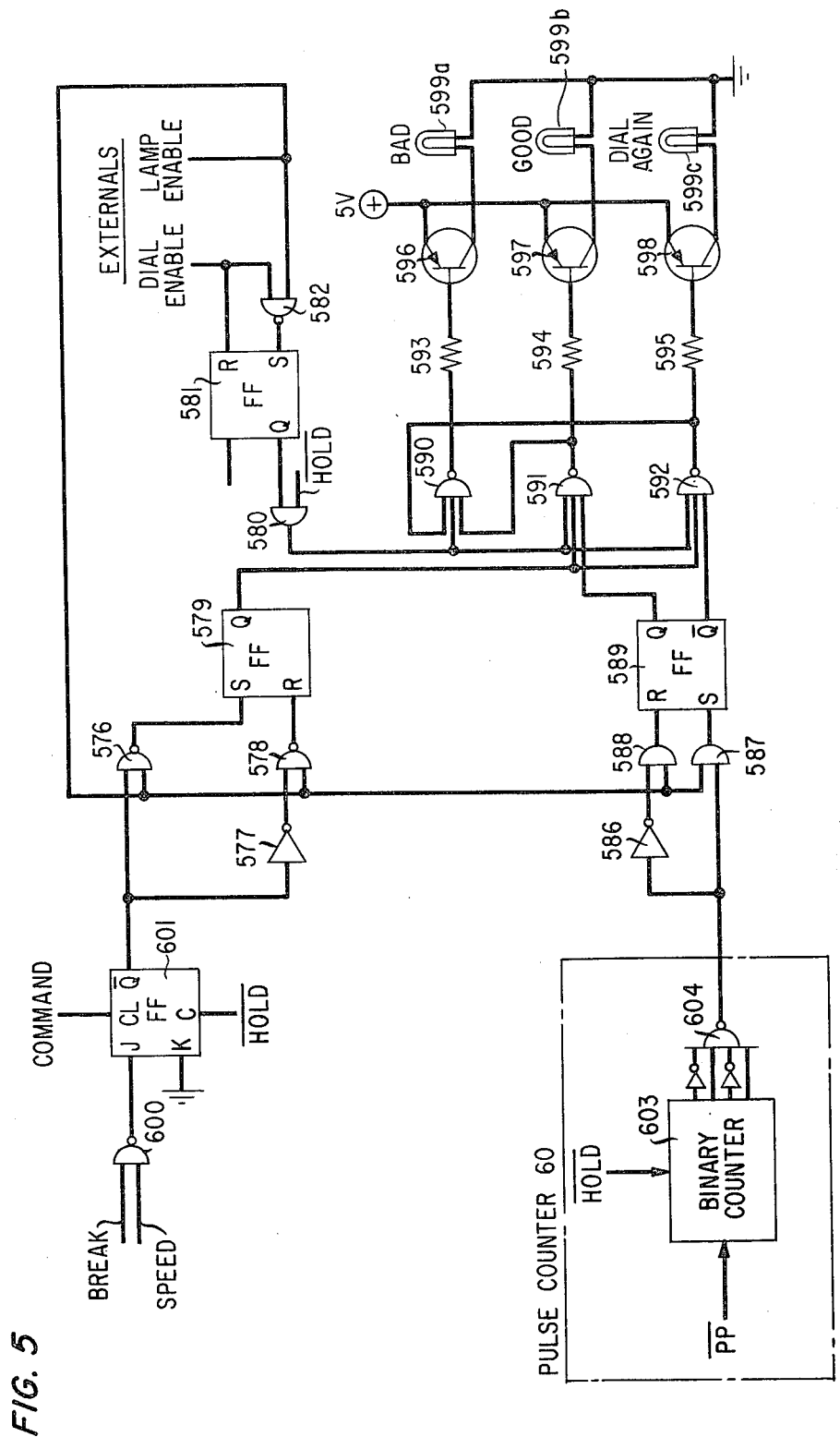
FIG. 5 is a circuit schematic of the pulse counter and the pass-fail lamp indicator portion of the diagram as shown in FIG. 1.

FIG. 5 shows the status lamp indicator circuit and the conventional pulse counter circuit 60.

The Lamp Enable control signal generated externally from the dial pulse analyzer is coupled to NAND gates 582, 576, 578 and to AND gates 587, 588. The Lamp Enable control signal, which is initiated 568 microseconds after the receipt of the tenth pulse, puts a logical 1 on the input of these gates to enable the gates only a short time before the pulse analyzer is reset.

The Dial Enable external control signal previously explained in this application is coupled to the other input of NAND gate 582 and to the reset input of flip-flop 581. The output of NAND gate 582 is coupled to the set input of flip-flop 581. With both the Lamp Enable control signal and the Dial Enable control signal activated, the output of NAND gate 582 is a logical 0, setting the flip-flop 581, which forces the Q of flip-flop 581 to a logical 1. The Q output of flip-flop 581 is coupled to one input of AND gate 580. The $\overline{Hold}$ command signal is coupled to the other input of AND gate 580. The output of AND gate 580 is coupled to NAND gates 590, 591, 592. This insures that the status lamps 599 will be activated only after ten pulses has been received.

The pulse counter circuit 60 is shown to the lower left of FIG. 5. This circuit comprises a 4-bit binary counter 603 and a NAND gate 604 which detect a total of ten dial pulses. This requirement insures full travel of the rotary dial during testing. The output of NAND gate 604 is coupled to AND gate 587, through inverter 586 to AND gate 588. The output of AND gate 587 is coupled to the set input of flip-flop 589 while the output of AND gate 588 is coupled to its reset input. The $\overline{Q}$ output of flip-flip 589 is coupled to one input of NAND gate 592 while the Q output of flip-flop 589 is coupled to one input of NAND gate 591. If 10 pulses have not been received, the flip-flop 589 remains reset, providing a logical 1 at its $\overline{Q}$ output. Thereafter, if flip-flop 579 (hereinafter described) is in its set condition, providing a logical 1 at its Q output, and if the last pulse has been received, providing a logical 1 at the output of AND gate 580, the "dial again" status indicator lamp 599c is lighted.

The output of the AND gate 559 (FIG. 4) from the break calculator 50 is coupled to the one input of NAND gate 600. The output of AND gate 450 (FIG. 4) from the speed calculator 40 is coupled to the other input of NAND gate 600. The output of NAND gate 600 is coupled to the J input of flip-flop 601. The K input of flip-flop 601 is always held to a logical 0. The COMMAND command signal is coupled to the clock input CL and the $\overline{Hold}$ signal is coupled to the clear input C of flip-flop 601. The $\overline{Q}$ output of flip-flop 601 is coupled to NAND gate 576 and through inverter 577 to NAND gate 578. The output of NAND gate 576 is coupled to the set input of flip-flop 579 and the output of NAND gate 578 is coupled to the reset input of flip-flop 579. The Q output of flip-flop 579 is coupled to AND gates 591, 592.

If the speed and percent break tests have been passed and the command signal COMMAND clocks the flip-flop 601, the $\overline{Q}$ output remains a logical 1. This, when coupled to NAND gates 576, 578, allows the flip-flop 579 to remain set which provides a logical 1 at its Q output. This logical 1 is present at the input of NAND gates 591, 592. If 10 pulses have been received, flip-flop 589 is reset and NAND gate 591 has all 1's at its input. The output of NAND gate 591 goes to a logical 0, allowing the "good" status indicator light 599b to illuminate, while at the same time holding the "bad" status indicator lamp 599a off. The resistors 593, 594, 595, the transistors 596, 597, 598 and the status indicating lamps 599a, 599b, 599c are conventional representations of an illuminating circuit and are shown for illustrative purposes only and form no part of the present invention. Equivalent circuits are known in the art.

If a bad pulse causes either the pulse speed or percent break tests to fail, the output of NAND gate 600 is a logical 1. This, when clocked into flip-flop 601, forces its $\overline{Q}$ output to a logical 0. Once the $\overline{Q}$ output of the flip-flop 601 is forced to a logical 0, it remains 0 until cleared by the $\overline{Hold}$ signal. Thus, after the last pulse is received, flip-flop is reset 579 forcing its Q output to a logical 0. A logical 0 at the input of NAND gate 591 will allow its output to remain a logical 1, which then puts a logical 1 at the input of NAND gate 590. If 10 pulses have been received, NAND gate 590 now has all 1's at its input and its output is now a logical 0. This logical 0 will allow the bad indicator lamp 599a to illuminate. This gives a visual indication to the operator if a bad pulse has been detected. Thus, the polarity of the output of NAND gate 600 determines whether the good or the bad status indicator lamps are illuminated. Although but one embodiment of the invention has been shown and described, it will be understood that it is only illustrative and that various modifications may be made therein without departing from the scope and spirit of this invention as defined in the appended claims.

What is claimed is:

1. Testing apparatus for determining if the percent break ratio of a dial pulse is within or without a specified range of percent break ratios, said apparatus comprising:
   a. a first means for generating first clock pulses having a selected frequency,
   b. a second means for generating second clock pulses having a frequency such that the ratio of said first clock pulse frequency to said second clock pulse frequency is the same as the minimum percent break ratio of the range,
   c. a third means for generating third clock pulses having a frequency such that the ratio of said first clock pulse frequency to said third clock pulse frequency is the same as the maximum percent break ratio of the range,
   d. a first means for counting the number of said first clock pulses generated during the dial pulse period,
   e. a second means for counting the number of said second clock pulses generated during the break portion of the dial pulse,
   f. a third means for counting the number of said third clock pulses generated during the break portion of the dial pulse, and
   g. comparator means connected to each of said counting means to compare the count of said first clock pulses with the count of said second clock pulses and to compare the count of said first clock pulses with the count of said third clock pulses.

2. Apparatus as in claim 1 wherein said comparator means is adapted to provide an output if the count of said first clock pulses is greater than the count of said second clock pulses and the count of said first clock pulses is less than the count of said third clock pulses.

3. Apparatus as in claim 2 wherein indicator means is connected to the output of said comparator means and provides a visual indication of the output of said comparator means.

4. Apparatus as in claim 1 wherein each of said means for generating clock pulses has a common clock source and includes frequency division circuitry connected to said common clock source.

5. Apparatus as in claim 1 comprising pulse speed detection means including
   h. a flip-flop having a set input and a reset input,
   i. a NAND gate connected to the set input of said flip-flop, said NAND gate being further connected to said first counting means and adapted to set said flip-flop whenever said NAND gate detects the count corresponding to the lower speed limit of the pulse train, and
   j. an AND gate connected to the reset input of said flip-flop, said AND gate being further connected to said first counting means and adapted to reset said flip-flop whenever said AND gate detects the count corresponding to the upper speed limit of the pulse train.

6. Apparatus as in claim 1 for determining if the percent break ratio of a plurality of dial pulses is within or without a specified range of percent break ratios, said apparatus comprising a second comparator, and wherein said means for counting the number of said first clock pulses includes a counter operative during the make portion preceding said break portion and a counter operative during the make portion following said break portion and wherein said second comparator is connected to each of said counters.

7. Testing apparatus for determining if the percent break ratio of a dial pulse train, each pulse having a break portion and a make portion, is within or without a specified range of percent break ratios, said apparatus comprising:
   a. a first means for generating first clock pulses having a selected frequency,
   b. a second means for generating second clock pulses having a frequency such that the ratio of said first clock pulse frequency to said second clock pulse frequency is the same as the minimum percent break ratio of the range,
   c. a third means for generating third clock pulses having a frequency such that the ratio of said first clock pulse frequency to said third clock pulse frequency is the same as the maximum percent break ratio of the range,
   d. a first means for counting the number of said first clock pulses generated during each pulse period comprising a break portion and a make portion preceding the break portion,
   e. a second means for counting the number of said first clock pulses generated during each pulse period comprising a break portion and a make portion following the break portion,
   f. a third means for counting the number of said second clock pulses generated during the break portion of each dial pulse,
   g. a fourth means for counting the number of said third clock pulses generated during the break portion of each dial pulse, and
   h. comparator means connected to each of said break counting means and to said first counting means, and adapted to compare the count of said first counting means with the count of said third counting means and to compare the count of said first counting means with the count of said fourth counting means, said comparator means being further connected to said second counting means, and adapted to compare the count of said second counting means with the count of said third counting means and to compare the count of said second counting means with the count of said fourth counting means.

8. Apparatus of claim 7 including a first detector means connected to the output of said comparator means and adapted to provide a pass output if the count of said first and second counting means is less than the count of said third counting means, and the count of said first and second counting means is greater than the count of said fourth counting means.

9. Apparatus of claim 8 including
   i. a first flip-flop having a set input and a reset input,
   j. a second flip-flop having a set input and a reset input, k. a first NAND gate connected to the set input of said first flip-flop, said first NAND gate being further connected to said first counting means and adapted to set said first flip-flop whenever said first NAND gate detects the count corresponding to the lower speed limit of the pulse train, l. a first AND gate connected to the reset input of said first flip-flop, said first AND gate being further connected to said first counting means and adapted to reset said first flip-flop whenever said first AND gate detects the count corresponding to the upper speed limit of the pulse train, m. a second NAND gate connected to the set input of said second flip-flop, said second NAND gate being further connected to said second counting means and adapted to set said second flip-flop whenever said second NAND gate detects the count corresponding to the lower speed limit of the pulse train, and n. a second AND gate connected to the reset input of said second flip-flop, said second AND gate being further connected to said second counting means and adapted to reset said second flip-flop whenever said second AND gate detects the count corresponding to the upper speed limit of the dial pulse train.

10. Apparatus of claim 9 including a second detector means connected to the outputs of said first and said second flip-flops and adapted to provide a pass output if said first and second flip-flops are in a set condition and including a third detection means connected to the outputs of said first and second detecting means and adapted to provide a pass output if the outputs of said first and second detecting means are pass.

* * * * *